UNITED STATES PATENT OFFICE.

ALEXANDER H. SIEGFRIED, OF SELIN'S GROVE, ASSIGNOR OF ONE-HALF TO TRUMAN H. PURDY, OF SUNBURY, PENNSYLVANIA.

PROCESS OF AND COMPOUND FOR TREATING IRON AND STEEL.

SPECIFICATION forming part of Letters Patent No. 238,749, dated March 8, 1881.

Application filed September 3, 1880. (Specimens.)

*To all whom it may concern:*

Be it known that I, ALEXANDER H. SIEGFRIED, of Selin's Grove, in the county of Snyder and State of Pennsylvania, have invented certain Improvements in Manufacturing Iron and Steel, of which the following is a specification.

My invention relates to a process and compound for treating iron and steel, to eliminate or neutralize, to a greater or less extent, the phosphorus, silicon, sulphur, and other deleterious matters contained therein.

The invention consists in combining with the metal, while it is in a molten condition, a compound composed of sulphate of copper, sal-soda or its chemical equivalent, carbonate of soda, chloride of sodium, sulphate of iron, sal-ammoniac, oxide of manganese, and nitrate of potassa, and thoroughly incorporating the same with the metal.

I prefer to use the ingredients in substantially the following proportions: Sulphate of copper, one pound; sal-soda, one pound; chloride of sodium, four pounds; sulphate of iron, one pound; sal-ammoniac, one pound; oxide of manganese, one pound; nitrate of potassa, one-quarter pound; but the proportions may be varied to a limited extent.

In making use of the compound I ordinarily apply the same in the proportion of from one and a half to four ounces of the compound to each hundred pounds of the metal to be treated; but the proportion may be increased, as the extreme impurity of the metal or other circumstances may require.

The compound may be applied to cast-iron in the smelting-furnace, or in a ladle or other receiver in which the metal may be drawn from the furnace, or it may be used in connection with the metal in a Bessemer converter, or in connection with the molten steel produced by the Siemens or other process. The metal may be subjected to successive applications of the material, if desired, at different stages in the ordinary course of converting cast-iron into wrought-iron or wrought-iron into steel.

I do not claim, broadly, herein, the application of carbonate of soda and sulphate of copper for the purification of molten metal, their application in certain limited proportions constituting the subject of a separate application, and their use in still higher proportions in connection with various other materials having been described in a patent granted to me September 24, 1872, No. 131,634.

Having thus described my invention, what I claim is—

1. The process of purifying iron or steel consisting in incorporating with the molten metal sulphate of copper, sal-soda, chloride of sodium, sulphate of iron, sal-ammoniac, oxide of manganese, and nitrate of potassa.

2. The compound for use in the purification of metals, consisting of sulphate of copper, sal-soda, chloride of sodium, sulphate of iron, sal-ammoniac, oxide of manganese, and nitrate of potassa.

ALEXANDER H. SIEGFRIED.

Witnesses:
P. T. DODGE,
GEO. F. GRAHAM.